US006894468B1

United States Patent
Bretz et al.

(10) Patent No.: US 6,894,468 B1
(45) Date of Patent: May 17, 2005

(54) CONTROL OF DC/DC CONVERTERS HAVING SYNCHRONOUS RECTIFIERS

(75) Inventors: Joshua H. Bretz, Marlborough, MA (US); Abram P. Dancy, Shrewsbury, MA (US); Leif E. LaWhite, Etna, NH (US); Martin F. Schlecht, Lexington, MA (US)

(73) Assignee: Synqor, Inc., Boxborough, MA (US)

( * ) Notice: Subject to any disclaimer, the term of this patent is extended or adjusted under 35 U.S.C. 154(b) by 0 days.

(21) Appl. No.: 09/611,383

(22) Filed: Jul. 7, 2000

Related U.S. Application Data

(60) Provisional application No. 60/172,884, filed on Dec. 20, 1999, provisional application No. 60/146,252, filed on Jul. 29, 1999, provisional application No. 60/143,980, filed on Jul. 15, 1999, and provisional application No. 60/142,580, filed on Jul. 7, 1999.

(51) Int. Cl.[7] .............................. G05F 1/40; G05F 1/56
(52) U.S. Cl. .................... 323/274; 323/351; 323/282
(58) Field of Search ................... 323/274, 277, 323/351, 282, 285

(56) References Cited

U.S. PATENT DOCUMENTS

| | | | |
|---|---|---|---|
| 3,754,177 A | 8/1973 | O'Reilly | 318/480 |
| 3,824,450 A | 7/1974 | Johnson et al. | 323/23 |
| 4,025,841 A * | 5/1977 | Chambers et al. | 323/268 |
| 4,318,007 A | 3/1982 | Rizzi | 307/44 |
| 4,346,342 A * | 8/1982 | Carollo | 323/273 |
| 4,728,807 A | 3/1988 | Harafuji et al. | 307/52 |
| 4,924,170 A | 5/1990 | Henze | 323/272 |
| 5,041,777 A * | 8/1991 | Riedger | 323/277 |
| 5,138,249 A | 8/1992 | Capel | 323/283 |
| 5,200,643 A | 4/1993 | Brown | 307/53 |
| 5,532,914 A | 7/1996 | Kageyama et al. | 363/50 |
| 5,583,753 A | 12/1996 | Takayama | 363/71 |
| 5,636,116 A | 6/1997 | Milavec et al. | 363/89 |
| 5,666,044 A * | 9/1997 | Tuozzolo | 323/277 |
| 5,687,049 A | 11/1997 | Mangtani | 361/18 |
| 5,708,571 A | 1/1998 | Shinada | 363/16 |
| 5,731,694 A * | 3/1998 | Wilcox et al. | 323/287 |
| 5,808,453 A | 9/1998 | Lee et al. | 323/224 |
| 5,834,925 A | 11/1998 | Chesavage | 323/272 |
| 5,920,475 A | 7/1999 | Boylan et al. | 363/127 |
| 5,939,871 A * | 8/1999 | Tanaka | 323/285 |
| 5,955,915 A * | 9/1999 | Edwards | 327/541 |
| 5,994,885 A * | 11/1999 | Wilcox et al. | 323/285 |
| 5,995,393 A * | 11/1999 | Deierlein | 363/49 |
| 5,999,417 A | 12/1999 | Schlecht | 363/16 |
| 6,031,400 A * | 2/2000 | Depuy | 327/103 |
| 6,127,814 A * | 10/2000 | Goder | 323/282 |
| 6,127,815 A * | 10/2000 | Wilcox | 323/282 |
| 6,140,804 A * | 10/2000 | Parker | 323/273 |
| 6,201,674 B1 * | 3/2001 | Warita et al. | 361/18 |
| 6,347,029 B1 * | 2/2002 | Ouyang et al. | 327/309 |
| 6,414,860 B1 * | 7/2002 | Li | 363/49 |
| 6,552,889 B1 * | 4/2003 | Huang et al. | 361/93.1 |

FOREIGN PATENT DOCUMENTS

| | | |
|---|---|---|
| DE | 3439180 A1 | 4/1986 |
| EP | 0741447 A2 | 11/1996 |
| EP | 0973246 A1 | 1/2000 |
| JP | 06339266 | 12/1994 |
| JP | 08223906 | 8/1996 |
| JP | 08289538 | 11/1996 |
| JP | 09065650 | 3/1997 |
| JP | 11136934 | 5/1999 |
| JP | 11146637 | 5/1999 |

* cited by examiner

*Primary Examiner*—Bao Q. Vu
(74) *Attorney, Agent, or Firm*—Hamilton, Brook, Smith & Reynolds, P.C.

(57) ABSTRACT

A DC to DC power converter includes synchronous rectifiers which respond to a control waveform. Negative current from a load into the power converter is prevented by increasing the converter output voltage at a minimum current limit. The synchronous rectifiers may be held off in response to decision logic by activation of a hold-off circuit connected to a control terminal of a synchronous rectifier or of an ORing transistor at the converter output. When the synchronous rectifier is subsequently enabled, its control waveform may be increased slowly relative to the switching cycle.

23 Claims, 12 Drawing Sheets

CONTROL OF DC/DC CONVERTERS HAVING SYNCHRONOUS RECTIFIERS

RELATED APPLICATION(S)

This application claims the benefit of U.S. Provisional Application Nos. 60/172,884 filed Dec. 20, 1999, 60/146,252 filed Jul. 29, 1999, 60/143,980 filed Jul. 15, 1999 and 60/142,580 filed Jul. 7, 1999, the entire teachings of which are incorporated herein by reference.

BACKGROUND OF THE INVENTION

Switching dc/dc converters, whether isolated or non-isolated, have long used a combination of transistors and diodes to implement their switching function. More recently, the diodes have been replaced with transistors called "synchronous rectifiers" for the purpose of reducing the power dissipated by the converter. Typically, MOSFETs are used for the synchronous rectifiers, although other types of transistors such as BJTs and JFETs could also be used. While these transistors can provide a lower on-state voltage than a diode, they do need to be turned on and off at the appropriate times in the switching cycle by the application of a voltage waveform on their "control terminal" (e.g. the gate terminal for a MOSFET). Most transistors (including MOSFETs) can carry current in either direction when they are turned on. Some transistors, such as the MOSFET, also have an anti-parallel body diode inherent in their structure that can carry current when the transistor is turned off. Sometimes a Schottky diode is placed in anti-parallel with the transistor to carry this latter current because it has a lower on-state voltage and a faster turn-off recovery time than the transistor's own body diode. Whether internal or external, this anti-parallel diode will be referred to herein as an "uncontrolled rectifier" to distinguish it from the active part of the transistor (i.e., the channel of a MOSFET), which will be referred to herein as a "controlled rectifier."

While synchronous rectifiers have been successfully applied in dc/dc converters, a problem arises with their use when two or more dc/dc converters must interact at their output. A dc/dc converter using controlled rectifiers can draw a negative output current, a result that was not possible when only diode rectifiers were used.

For instance, when two dc/dc converters are connected in parallel to provide more output power or redundancy, it is possible for one converter to deliver more output current than the load requires and for the other converter to draw a negative output current to remove the excess. This might typically happen because the first converter wants the output voltage to be higher than does the second converter.

Schemes to enforce current sharing between paralleled converters might solve this problem in the steady state, but they are difficult to make work during "start-up" transients when the converter has been turned on and is switching, but steady-state conditions have not yet reached. They are also difficult to make work during conditions where one or more converter has gone into a current limit or short-circuit protection. Often paralleled dc/dc converters with synchronous rectifiers become oscillatory or have other performance problems under these conditions.

Even with the paralleled converters operating in the steady state, they will not share the load current perfectly. When the total load current is small, one or more dc/dc converters may actually be drawing a negative current. This condition could cause the performance problems mentioned above. At the very least, it results in an inefficient situation where excess power is circulated among the paralleled dc/dc converters.

When redundancy is desired, paralleled converters are often connected at their outputs through diodes so that one failed converter will not bring down the output bus. This "ORing diode" can solve the problem mentioned above because it prevents a converter from drawing a negative output current. However, it is desirable to replace the ORing diode with an "ORing transistor" to reduce its power dissipation. An ORing transistor includes at least a controlled rectifier and may also include an uncontrolled rectifier. Since the controlled rectifier can carry current in both directions when it is turned on, the ORing transistor no longer solves the negative current problem.

Besides paralleled converters, another place where the negative current problem mentioned above comes into play is when connections are made between the outputs of two or more converters to ensure that the difference between their output voltages does not exceed some limit. For example, in a system where both a 5V output converter and a 3.3V output converter are used, it is sometimes desirable to place a "clamp diode" between the 3.3V output and the 5V output to ensure that the 3.3V output never gets more than one diode-drop above the 5V output. Conversely, a chain of three or four clamp diodes in series may be placed between the 5V output and the 3.3V output to ensure the former never gets too high compared to the latter.

If, during start-up or some other transient condition, these clamp diodes become forward biased, then a condition may once again exist in which one converter delivers more output current than is needed by the entire load, and the other converter draws a negative output current. The converters may oscillate or otherwise not work correctly under this condition.

Whether converters are connected together at their outputs directly, through ORing transistors, or through clamp diodes, another condition where the negative current problem can arise is when one of the converters is "shut-down." This shut-down state may be externally commanded through an ON/OFF control input, or it may be the result of the converter's own protection circuitry sensing an abnormal condition such as a voltage, current, or temperature that is too high. In all such cases, the converter that is shutdown may draw a negative output current from another converter that is holding up the first one's output voltage.

Other conditions not described here may also arise in which a problem is caused by the ability of a dc/dc converter with synchronous rectifiers to draw a negative current.

SUMMARY OF THE INVENTION

To avoid the problems mentioned above, one solution presented herein is to ensure the synchronous rectifiers and/or the ORing transistors are "disabled" (i.e., kept from turning on) under the conditions that create the problems. Once this is done, output currents can still flow, but only through the uncontrolled rectifiers. These uncontrolled rectifiers prohibit negative current flow, and therefore the problems associated with negative current flow are eliminated.

This disabling of the controlled rectifiers can be done in anticipation of the negative current problem or as a result of a sensed condition that indicates the problem exists.

When the conditions under which the negative current problem might arise no longer exists, the controlled rectifiers can once again be "enabled" (i.e., allowed to turn on) so that they function as intended.

Since the voltage drop across a controlled rectifier is smaller than that across an uncontrolled rectifier, the output voltage will undergo a transient if the controlled rectifier is suddenly enabled. To avoid this transient, the controlled rectifiers should be turned on in a manner that causes the average on-state voltage of the combined device to change slowly (relative to the bandwidth of the converter) from that of the uncontrolled rectifier to that of the controlled rectifier. By "average on-state voltage" it is meant the average value of the voltage drop across the parallel combination of the controlled and uncontrolled rectifiers during the time that they are conducting current. For the synchronous rectifier, this time is only a portion of the overall switching cycle.

Another solution presented herein to the negative current problem is to incorporate a "minimum current limit" in the control circuitry of the dc/dc converter. A minimum current limit compares the output current to some threshold, and raises the output voltage when the output current falls below this threshold so as to limit the further decrease of the current. The threshold current level might be slightly negative, zero, or slightly positive. Furthermore, the minimum current limit can be implemented with either a fold-forward, a constant current source, or a fold-back characteristic.

These two approaches for avoiding the negative current problem (i.e., disabling the controlled rectifiers and incorporating a minimum current limit) can be used separately or together.

In accordance with one aspect of the invention, a DC to DC power converter includes a control circuit which controls the output voltage of the converter. The converter further includes an override control to the control circuit, responsive to a condition of the power converter or connected circuitry, to effect a minimum current limit. Preferably, the power converter includes a synchronous rectifier, and the override control substantially eliminates negative current flow through the controlled rectifier of the synchronous rectifier.

To effect the minimum current limit, the override control may increase the voltage output of the power converter. The minimum current limit may be a small negative or positive current, and may take the form of a current source, fold-back or fold-forward.

The override control may respond directly to sensed output current or to some other signal indicative of output current. For example, the signal indicative of output current may be a sensed current within the power converter such as current through an ORing transistor coupled to the output of the power converter or other controlled rectifier in the power converter.

The system may further disable at least one controlled rectifier in the power converter circuit in response to decision logic. For example, an ORing transistor at the output of the power converter may be disabled.

One power converter to which the invention is applied comprises first and second primary transformer windings connected to a power source. A secondary transformer winding circuit has at least one secondary winding coupled to at least one of the first and second primary windings. Each of plural controlled rectifiers has a parallel uncontrolled rectifier and is connected to a secondary winding. Each controlled rectifier is turned on and off in synchronization with the voltage waveform across a primary winding to provide the output. Each primary winding has a voltage waveform with a fixed duty cycle and transition times which are short relative to the on-state and off-state times of the controlled rectifiers. A regulator regulates the output while the fixed duty cycle is maintained.

In accordance with another aspect of the invention, a DC to DC power converter comprises a controlled rectifier and an uncontrolled rectifier in a power circuit. A connection impedance is provided between a power circuit waveform and a controlled terminal of the controlled rectifier. Hold-off circuitry is activated to disable the controlled rectifier.

The controlled rectifier may, for example, be a synchronous rectifier in the power circuit or an ORing transistor at the output of the power converter. The connection impedance may be a completely passive circuit between the power circuit waveform and the control terminal of the controlled rectifier. The power circuit waveform may be a voltage waveform, and the controlled rectifier may be implemented with a MOSFET.

In certain embodiments, the connection impedance comprises a capacitor and may include a resistor in parallel with the capacitor. A parallel impedance may be connected in parallel with the hold-off circuitry to further attenuate the power circuit waveform when the hold-off circuitry is deactivated. The hold-off circuitry may comprise a transistor between the control terminal and another terminal of the controlled rectifier to hold the controlled rectifier off when the switch is closed, and a diode may be connected in series with the transistor.

A waveform having a negative average may be produced at the control terminal of the controlled rectifier when the hold-off circuitry is activated. When the hold-off circuitry is deactivated, the waveform average applied to the control terminal increases slowly.

The hold-off circuitry may be activated by an enable/disable input signal from decision logic. The decision logic may activate the hold-off circuitry when the power convert is shut down, in response to an indication of low output voltage from the power converter, in response to an indication of low output current from the power converter, during startup of the power converter, during a turn-off transient of the power converter, or in response to an external signal. In particular, the hold-off circuitry may be inactivated in response to an indication that the waveform at the control terminal of the controlled rectifier will not result in correct drive. For example, the hold-off circuitry may be activated in response to a low voltage from a regulation stage of the power converter. The hold-off circuitry may be activated in response to the power rail of the converter being too low or in response to a waveform controlling the controlled rectifier being too low.

In accordance with a further aspect of the invention, a DC to DC power converter comprises a controlled rectifier responsive to a control waveform applied to a control terminal. Decision logic generates an enable/disable signal to disable the controlled rectifier. A circuit is responsive to the enable/disable signal to gradually change the degree to which the controlled rectifier is turned on or off such that a substantial momentary deviation in the output voltage is avoided when the controlled rectifier is enabled or disabled. The control waveform may be provided passively from a power circuit of the power converter. The time over which the average of the control waveform changes may be determined by a resistive/capacitive circuit between the control terminal and the power circuit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Throughout this discussion, MOSFETs will be used to implement the synchronous rectifiers and the ORing transistors since the MOSFET is the preferred device at this time. One skilled in the art would know how to incorporate the concepts presented here for other types of transistors that might instead be used.

When synchronous rectifiers are used in a dc/dc converter, there are two ways to provide the control terminals the signals necessary to turn the controlled rectifiers on and off during the switching cycle. One approach, hereafter referred to as the "active-drive" approach, is to provide the control signal with electronic circuitry that may get its timing information from other electronic circuitry or from voltage or current waveforms within the power circuit. The second approach, hereafter referred to as the "passive-drive" approach, is to provide the control signal either directly or through passive circuitry (such as resistors, capacitors, and/or inductors) from a waveform in the power circuit.

Figure 1:
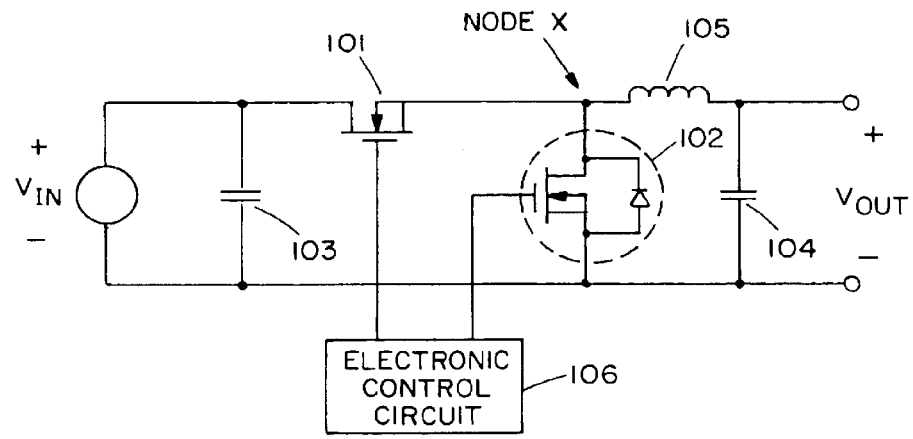
FIG. 1 illustrates a non-isolated down-converter using synchronous rectification and an active drive scheme.

The active-drive approach is most often used in non-isolated dc/dc converters. FIG. 1 depicts a down-converter having a switching transistor 101 and a synchronous rectifier 102, two filter capacitors, 103 and 104, and a filter inductor 105. As FIG. 1 shows, the same control circuit 106 that turns on and off transistor 101 of a down-converter can be easily designed to turn on and off the synchronous rectifier 102 of this converter. Such integrated circuits are available from companies such as LTC, Maxim, and Unitrode.

Figure 2:
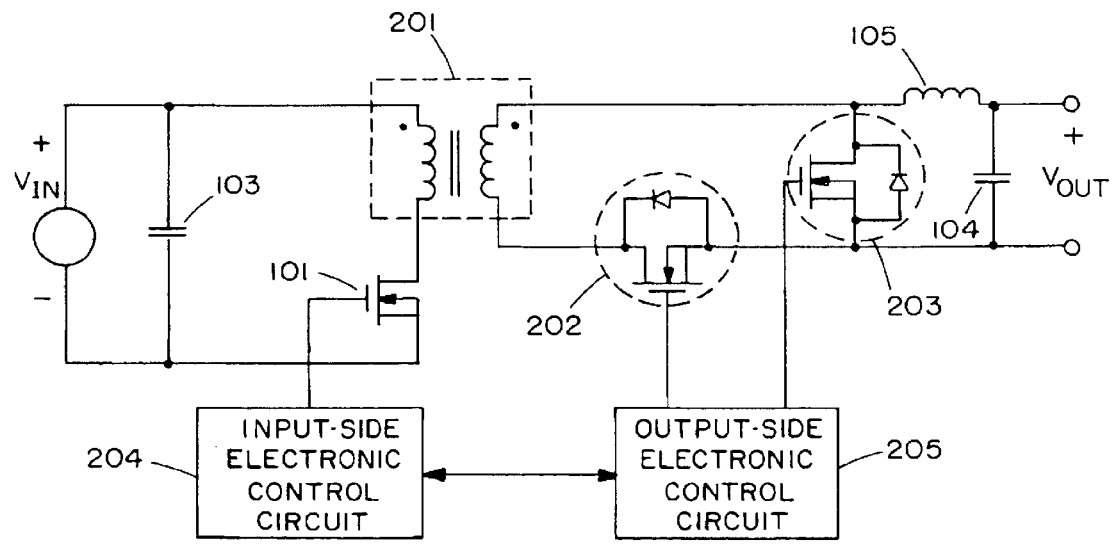
FIG. 2 illustrates an isolated forward converter using synchronous rectification and an active drive scheme.

Either the active-drive or passive-drive approach might be used in dc/dc converters that have transformers. FIG. 2 depicts an isolated forward converter having a transformer 201, a switching transistor 101 and two synchronous rectifiers 202 and 203, and filter elements 103,104, and 105. As FIG. 2 shows, some designers provide electronic control circuitry on the output side of the converter to drive the synchronous rectifiers. Output-side control circuitry 205 might create its own timing signals for driving transistors 202 and 203, it might derive them from waveforms in the power circuit, or it might derive them from signals passed to it (through an isolation link such as a transformer or a opto-coupler) from control circuit 204 on the input side of the power circuit. Examples of these schemes are well known in the art.

Figure 3:
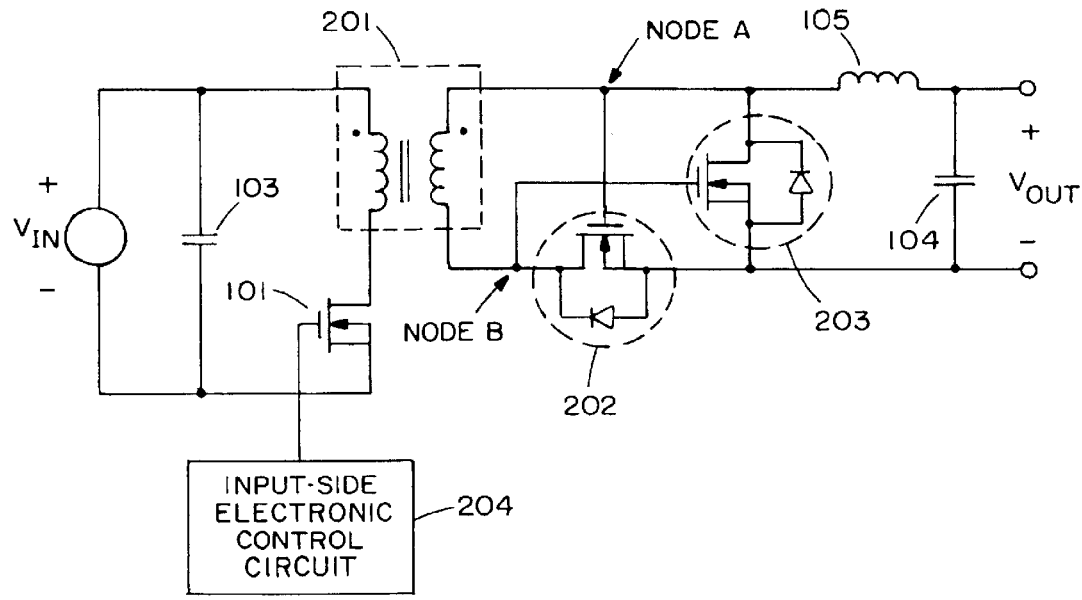
FIG. 3 illustrates an isolated forward converter using synchronous rectification and a passive drive scheme.

FIG. 3 shows an example of how to control synchronous rectifiers 202 and 203 by connecting their control terminals directly to nodes in the power circuit. When control circuit 204 turns on transistor 101, the resultant positive voltage across the transformer 201 will cause the voltage at node A to be high, which will turn on synchronous rectifier 202. The voltage at node B will then be low, which will turn off synchronous rectifier 203. During this portion of the switching cycle power will flow from the input source, through the transformer, and out to the load. During the second portion of the switching cycle when transistor 101 is off and the transformer is resetting, the voltage across the transformer will be negative. The voltages at nodes A and B will then be such that synchronous rectifier 202 will be turned off and synchronous rectifier 203 will be turned on to maintain the current flow in inductor 105.

Figure 4:
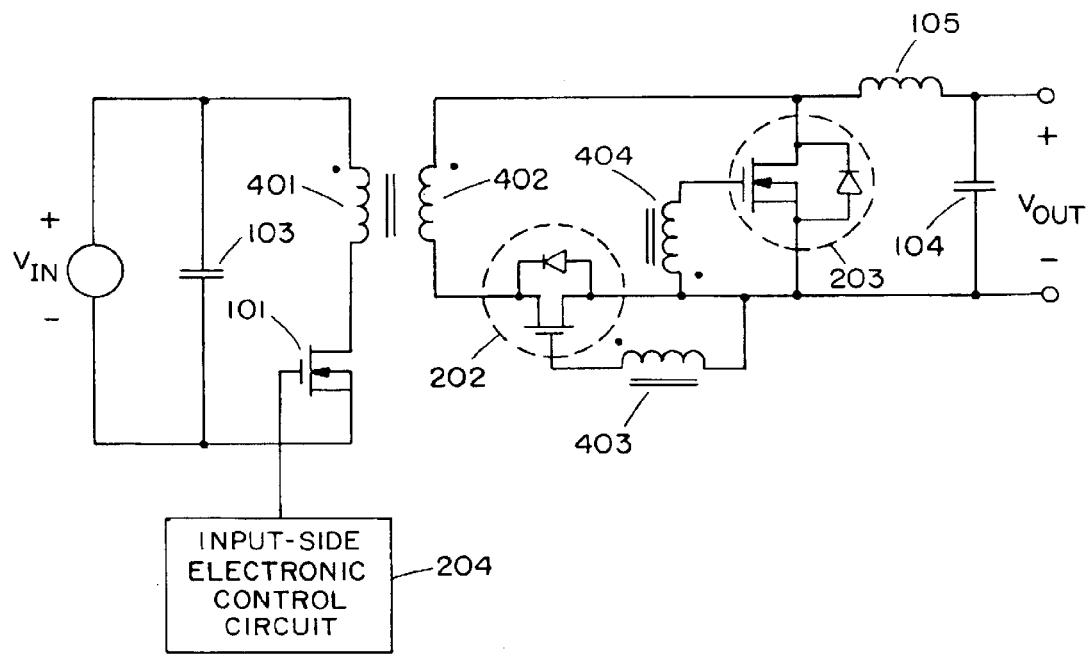
FIG. 4 illustrates an isolated forward converter with the synchronous rectifiers driven by auxiliary transformer windings.

FIG. 4 shows a variation of the approach depicted in FIG. 3 where auxiliary windings 403 and 404 have been added to the isolation transformer's primary winding 401 and secondary winding 402 to drive the control terminals of the synchronous rectifiers 202 and 203. The polarity of these auxiliary windings are arranged to make sure the correct synchronous rectifier is turned on during each portion of the switching cycle, and the turns-ratios are chosen to provide the correct level of drive voltage. Other examples of using auxiliary transformer windings are well known in the art.

Figure 5:
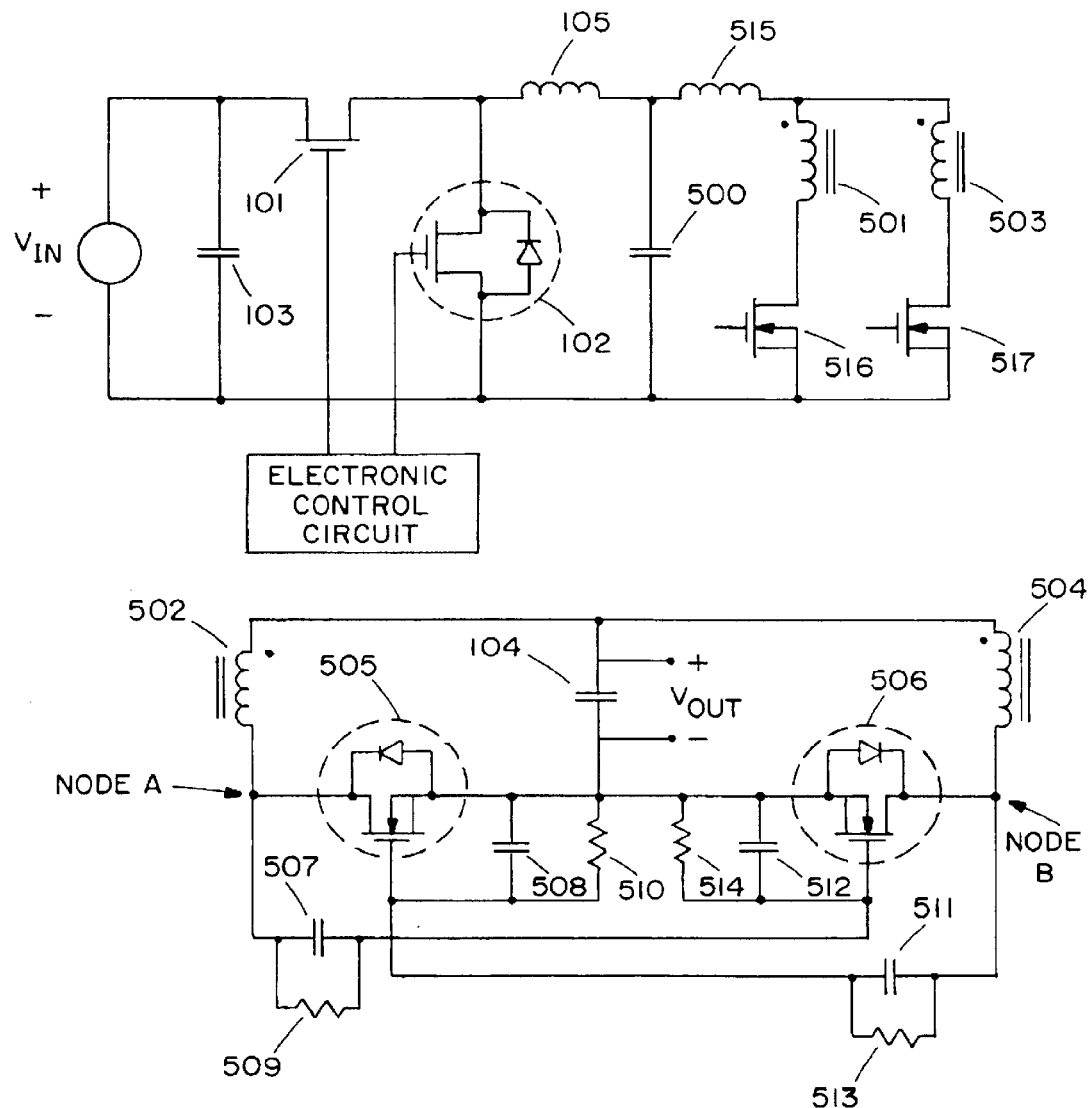
FIG. 5 illustrates another isolated dc/dc converter using synchronous rectifiers driven through passive circuitry.

For the passive drive approach it is also possible to add passive components to the connection between a synchronous rectifier's control terminal and the power circuit to achieve some desired result. For instance, FIG. 5 shows another transformer-based dc/dc converter which incorporates a down converter stage, composed of transistors 101 and 102 and filter elements 105, 500 and 515, to provide regulation and an isolation stage with two transformers having primary windings 501 and 503 and secondary windings 502 and 504. Transistors 516 and 517 alternately connect primary windings 501 and 503 to the output of the regulation stage, and synchronous rectifiers 505 and 506 alternately connect the secondary windings to the output capacitor 104. Capacitor/resistor dividers (composed of elements 507–510 and elements 511–514) are used to provide drive signals to synchronous rectifiers 505 and 506 that are smaller than the waveforms provided by the power circuit at nodes A and B. This concept was described in more detail in PCT Application No. WO98/33267 published 30 Jul. 1998, the contents of which are incorporated herein by reference in their entirety.

Figure 6:
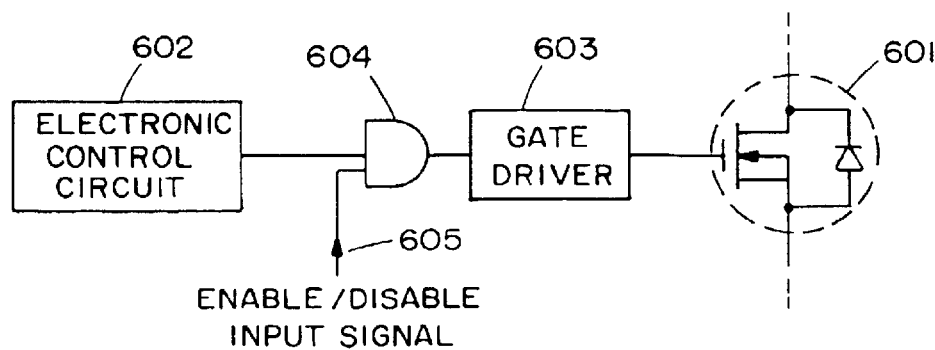
FIG. 6 illustrates an insertion of a logic gate in an active drive circuit to enable/disable a synchronous rectifier.

When the control terminals of the synchronous rectifiers are driven with electronic circuitry, the mechanism by which they can be enabled or disabled is straightforward. For instance, a logic gate 604 could be added to the signal path between the control circuit 602 and the synchronous rectifier's gate driver 603, as shown in FIG. 6. This logic gate could take many forms, it might be composed of an integrated circuit or discrete parts, and its location in the signal path has some flexibility beyond the placement shown here, all of which would be immediately apparent to one skilled in the art. In all cases, the logic gate requires an input signal 605 to tell it when to enable/disable the synchronous rectifier. The manner in which this signal might be generated will be discussed later.

When the control terminals are driven from a voltage or current waveform in the power circuit, other techniques can be used to enable/disable the synchronous rectifiers. For example, a "connection switch" could be placed in series with the control terminal to connect or disconnect the control terminal from the waveform in the power circuit. In addition to the connection switch, the circuit might also require "hold-off circuitry" to ensure the synchronous rectifier is held off when the connection switch is turned off.

Figure 7:
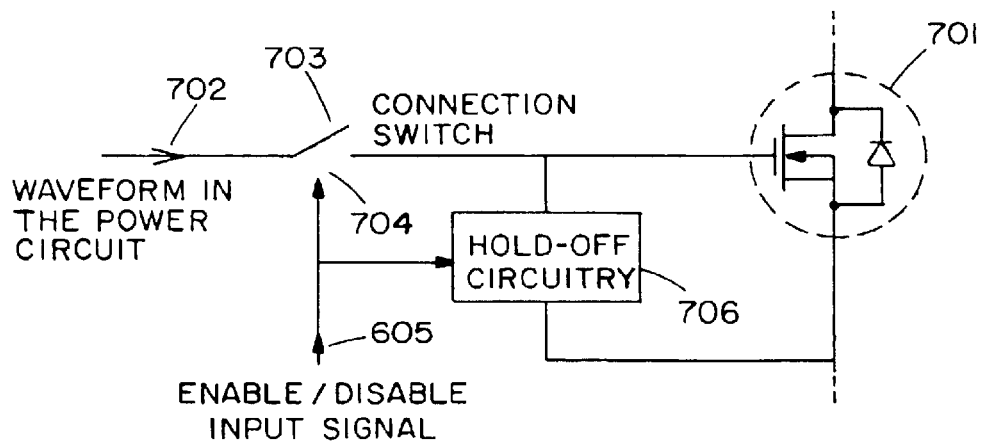
FIG. 7 illustrates an insertion of a connection switch and a hold-off circuitry in a passive gate drive circuit to enable/disable a synchronous rectifier.

FIG. 7 shows one embodiment of this approach where MOSFET 701 is used for a synchronous rectifier in a power circuit. Connection switch 703 connects the waveform in the power circuit 702 to the gate of the MOSFET. This connection switch is turned on and off with a signal applied to its control terminal 704. Hold-off circuitry 706 might be a passive impedance such as a resistor, or it might be another switch that is turned on when the connection switch 703 is turned off, or it might a more complex electronic circuit. If a resistor is used, it should be low enough in resistance to discharge the parasitic capacitance of the MOSFET's gate in the time required, yet high enough in resistance to keep its power dissipation small when the synchronous rectifier is enabled.

Figure 8:
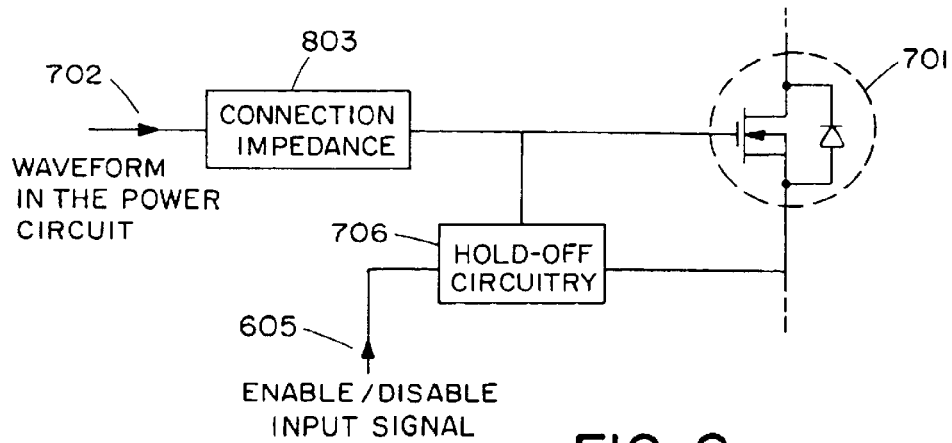
FIG. 8 illustrates an insertion of a connection impedance and a hold-off circuitry in a passive gate drive circuit to enable/disable a synchronous rectifier.

Another approach to use when the control terminals are passively driven from waveforms in the power circuit is depicted in FIG. 8. Rather than the switch of FIG. 7, a "connection impedance" 803 is placed between the power circuit waveform 702 and the control terminal of the MOSFET 701 used for a synchronous rectifier. This connection impedance works in conjunction with the hold-off circuitry 706 to enable/disable the MOSFET in the following manner. When the MOSFET is to be disabled, the hold-off circuitry is activated so that it pulls the MOSFET's gate-source voltage below its threshold level. During this state the connection impedance permits the waveform at the control terminal of the MOSFET to be different than the power circuit waveform 702. Conversely, when the synchronous rectifier is to be enabled, the hold-off circuitry is deactivated and the control terminal waveform is representative of the power circuit waveforms with, perhaps, some attenuation. Note that in this scheme, the hold-off circuitry requires active components.

In this second approach, the connection impedance should be chosen such that the level of current flowing through the hold-off circuitry when it is activated is acceptably low while still maintaining a proper waveform on the control terminal when the hold-off circuitry is deactivated.

Figure 9:
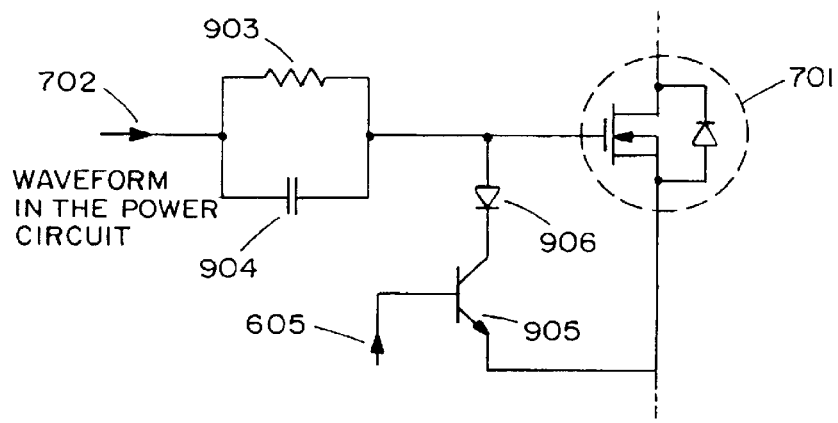
FIG. 9 illustrates a specific implementation of the concepts depicted in FIG. 8.

FIG. 9 shows a more specific example of the concepts depicted in FIG. 8 as they are applied to the capacitor/resistor divider concept depicted in FIG. 5. The parallel combination of capacitor 903 and resistor 904 form the connection impedance, and transistor 905 in series with diode 906 form the hold-off circuitry.

Now consider FIG. 5 in which both synchronous rectifiers 505 and 506 have the connection impedance and hold-off circuitry depicted in FIGS. 8 and 9. A switch 905 and a diode 906 are placed in parallel with each of the RC circuits 508,510 and 512,514. When the isolation stage of FIG. 5 is switching, the voltage waveforms at the nodes marked A and B are square waves. During one half of the cycle (herein referred to as the "reset half of the cycle") the voltage of the square-wave is near zero, and during the other half of the cycle (herein referred to as the "drive half of the cycle") the voltage is near twice the output voltage. The two square-wave waveforms at nodes A and B are 180 degrees out of phase with respect to one another. See PCT Application No. WO98/33267 published 30 Jul. 1998 for a complete description of how this power circuit works.

With the hold-off circuitry deactivated (and assuming that the time constants of the paralleled resistors and capacitors are long compared to the switching period), the voltage waveforms on the gates of the synchronous rectifiers have the same shape as the waveforms of nodes A and B. The ac components are attenuated by the divider effect of the capacitors ($C_{507}/(C_{507}+C_{512})$ or $C_{511}/(C_{511}+C_{508})$) and the dc components are attenuated by the divider effect of the resistors ($R_{514}/(R_{509}+R_{514})$ or $R_{510}/(R_{513}+R_{510})$). In this manner it is possible to keep the maximum voltage applied to the gate terminals of the synchronous rectifiers within their ratings even though the voltages at nodes A and B go too high. As such, the connection impedance serves two purposes in this case: a voltage divider and a means by which the synchronous rectifier can be disabled.

For instance, if the output voltage is 15 volts, the voltages at nodes A and B will be square-waves going between near zero volts and near 30 volts. Thirty volts is usually too high a voltage to apply to the gate of a MOSFET. But if we make the capacitance of capacitor 507 half that of capacitor 512 and the resistance of resistor 509 twice that of resistor 514, then the voltage waveform at the gate terminal of MOSFET 506 will be an attenuated square-wave that goes between near 0 volts and near 10 volts. Many MOSFETs can tolerate this range.

Note that even when attenuation of the gate waveform is not desired, the connection impedance shown in FIG. 9 can still be added to the circuit to permit the hold-off circuitry to disable the synchronous rectifiers. It is simply necessary to make $C_{904}$ large compared to any parasitic capacitance of the MOSFET's gate terminal (and $R_{903}$ small compared to the effective resistance of the deactivated hold-off circuitry) so that the attenuation of the waveform will be minimal.

When the transistors of the hold-off circuitry are turned on, the hold-off circuitry holds, or clamps, the gate waveforms near zero during the drive half of the cycle. These gate waveforms then go negative during the reset half of the cycle since capacitors 507 and 511 appear as a low impedance for the AC components of the waveforms at nodes A and B. The gate waveforms therefore have the same square-wave shape they used to have, but the dc components of these square-waves are lowered such that the highest voltage the gate waveforms achieve does not reach the gate-source threshold level required to turn on the MOSFETs they drive.

Note that once the hold-off circuitry is activated, the current that flows through transistor 905 is relatively small compared to the total current that flows through the entire connection impedance. To good approximation, the transistor carries only the DC current flowing through resistor 903, while the AC currents flowing through the connection impedance flow through the gate-source capacitance of the synchronous rectifier 701 (or through an external capacitor located in parallel with the gate-source such as capacitor 508 in FIG. 5). Since resistor 903 is relatively large compared to the impedance of capacitor 904, this DC current is relatively small. As such, the connection impedance approach requires a smaller transistor than does the connection switch approach depicted in FIG. 7.

During this disabled state, the gate waveforms are able to go slightly positive due to the voltage drop across the series connection of the diode and transistor of the hold-off circuitry. This positive value must be kept smaller than the threshold voltage of the MOSFETs. Techniques that can be used to ensure this condition include using Schottly diodes, making the on-state voltage of the hold-off transistor as small as possible, and connecting the hold-off circuitry to a negative voltage potential instead of ground. Other techniques will be apparent to one skilled in the art given the ideas presented here.

It is the negative value of the gate waveform during the reset half of the cycle that is the reason for adding the diode in series with the transistor in the hold-off circuitry shown in FIG. 9.

Figure 10:
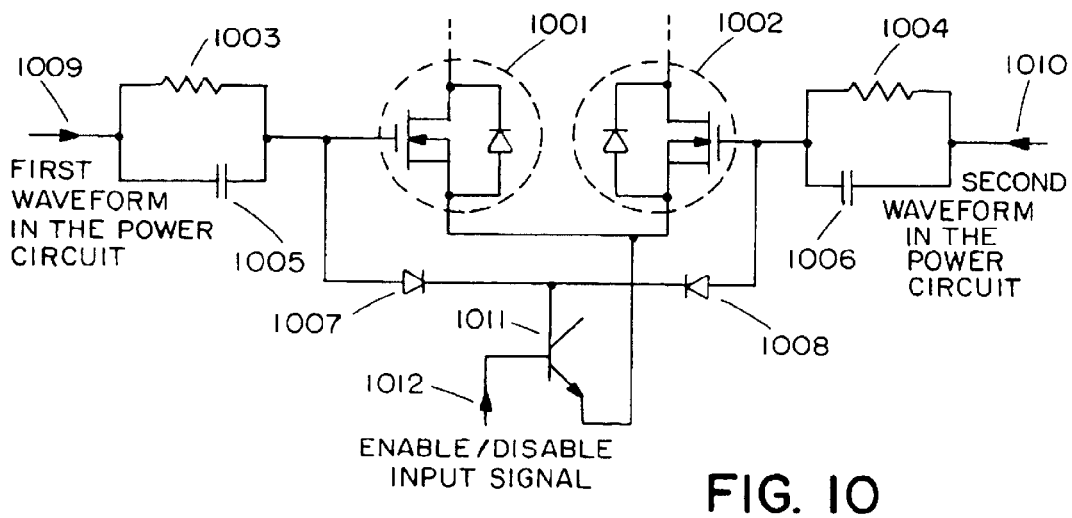
FIG. 10 illustrates the implementation of FIG. 9 modified such that only one transistor is used in the hold-off circuitry for two synchronous rectifiers.

It is possible for the hold-off circuitry to use only one transistor instead of the two to disable two synchronous rectifiers. As shown in FIG. 10, a single transistor 1011 is connected to the two gate terminals of synchronous rectifiers 1001 and 1002 through diodes 1007 and 1008. In this configuration, transistor 1011 works with diode 1007 to clamp the gate voltage of MOSFET 1001 during its drive half cycle, and it then works with diode 1008 to clamp the gate voltage of MOSFET 1002 on the next half cycle.

FIGS. 9 and 10 show the transistor (905 or 1011) of the hold-off circuitry as a bipolar transistor. Other transistors, such as a MOSFET could also be used.

Figure 11:
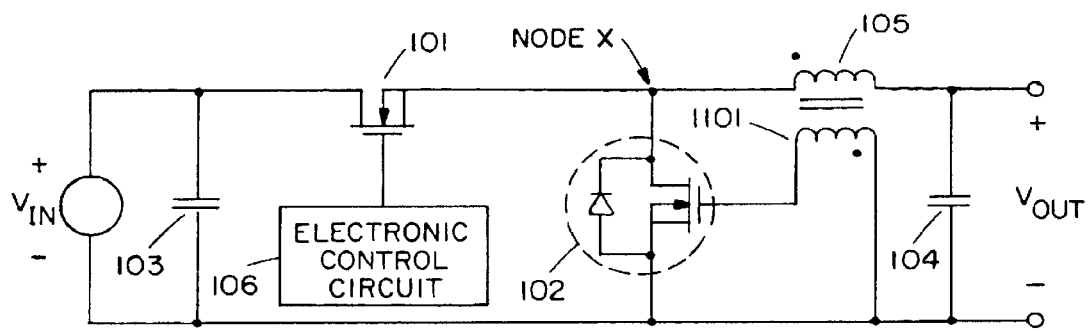
FIG. 11 illustrates a non-isolated down-converter using synchronous rectification and a passive drive.

Although the discussion above points out that the active-drive approach is most often used in a non-isolated converter, it is also possible to use the passive-drive approach. For instance, in the down converter of FIG. 1, a second winding 1101 with an appropriate turns-ratio could be added to inductor 105 and connected to the gate terminal of synchronous rectifier 102, as shown in FIG. 11. The concepts outlined above for using a connection switch or a connection impedance in conjunction with hold-off circuitry could therefore be applied in this situation, as well.

Figure 12:
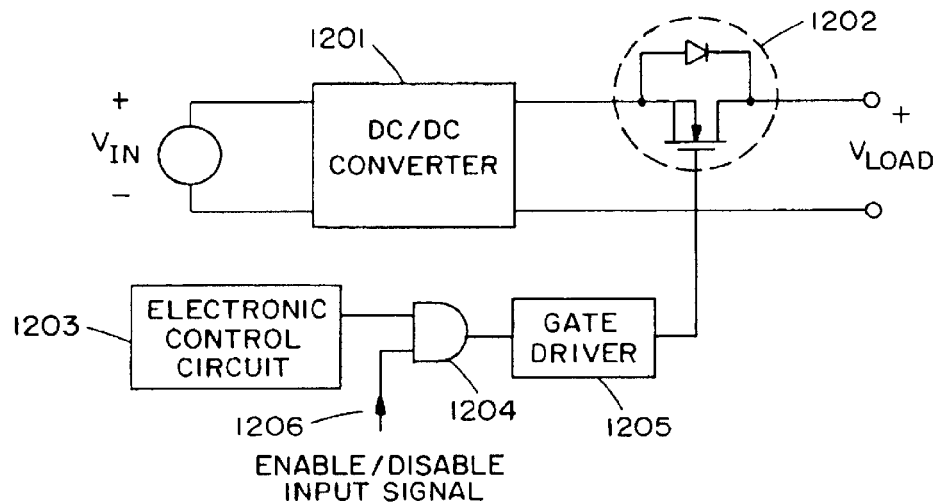
FIG. 12 illustrates an ORing transistor driven by an active control circuit with a logic gate to provide the enabling/disabling function.

When an ORing transistor is used to connect a dc/dc converter's output to the output bus the negative current problem can also be solved by turning off the controlled rectifier of this device. Doing so leaves the converter connected to the output bus only through the uncontrolled rectifier that does not permit negative current flow. As shown in FIG. 12, an active electronic circuit 1203 and gate driver 1205 might be used to control the ORing transistor 1202, in which case a logic gate 1204 could provide the enabling/disabling function.

Figure 13:
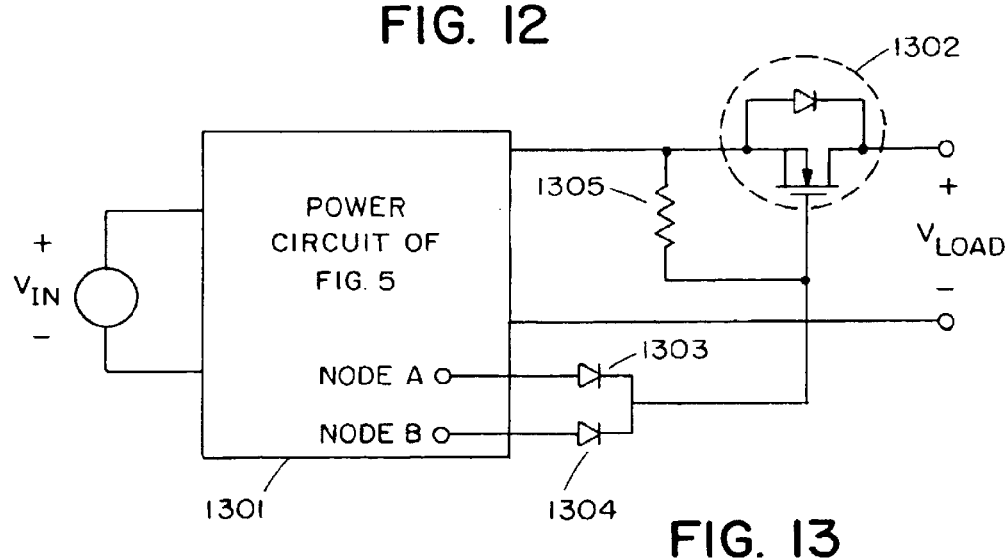
FIG. 13 illustrates an ORing transistor driven by waveforms in the power circuit shown in FIG. 5.

It is also possible to drive the control terminal of the ORing transistor from waveforms in the power circuit. FIG. 13 shows one way this might be accomplished for the converter of FIG. 5. In this approach, the voltage waveforms at nodes A and B of the power circuit 1301 of FIG. 5 are connected through diodes 1303 and 1304 to the gate terminal of the ORing MOSFET 1302. As mentioned earlier, when the power ill circuit is switching, the voltage waveforms at nodes A and B are out-of-phase square-waves that extend between near zero volts and near twice the output voltage. Diodes 1303 and 1304 peak-detect these waveforms to give a gate-source voltage of approximately the output voltage. If these waveforms are not present, such as when the converter is not operating, resistor 1305 will discharge the gate of the ORing transistor 1302 to turn it off. In this case, the enabling/disabling schemes that use connection switches, connection impedances, and hold-off circuitry mentioned above for synchronous rectifiers could be used here for the ORing transistor, as well.

Regardless of the approach followed for enabling/disabling the controlled rectifiers of synchronous rectifiers and/or ORing transistors, a logical decision must be made as to when they should be enabled or disabled. Based on this decision, appropriate "enable/disable input signals" would then be generated for the logic gates, connection switches, or hold-off circuitry mentioned above (or for any other enabling/disabling circuitry that becomes apparent to one skilled in the art given the ideas presented here). Several example approaches for making this decision and for providing the enable/disable input signals are given below. These approaches, herein referred to as the "decision logic," may be used alone or in a combination of two or more.

Figure 14:
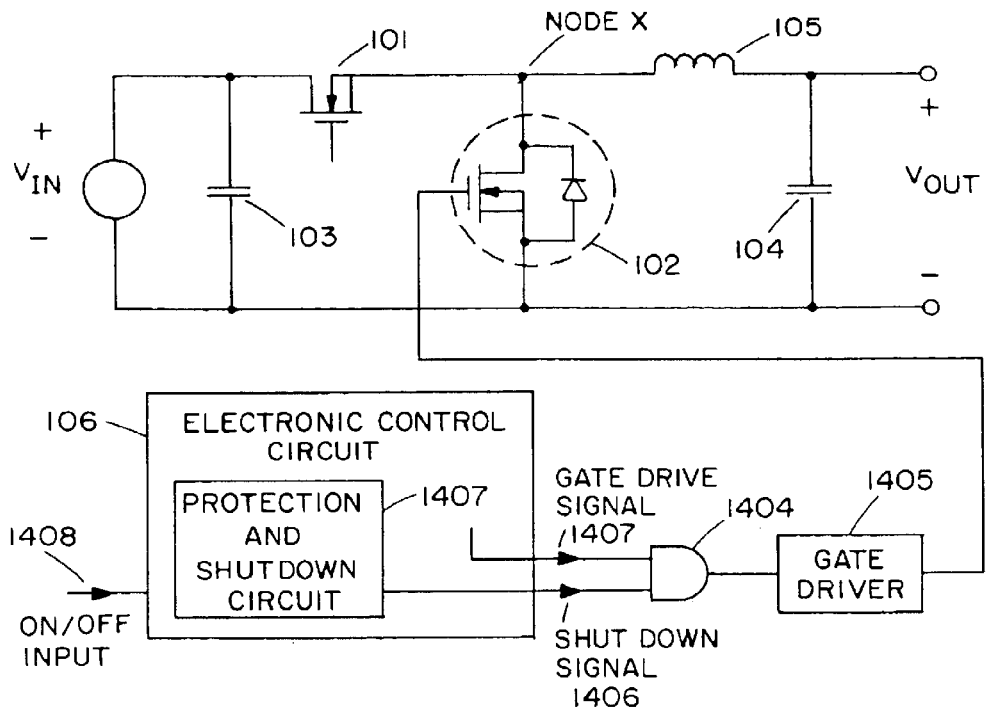
FIG. 14 illustrates deriving the enable/disable signal from the control circuit's shutdown signal.

One decision logic approach that could be used is to disable the controlled rectifiers of synchronous rectifiers and/or ORing transistors whenever the converter is shutdown. This "shutdown decision logic" ensures that the converter will not draw a negative current when the converter is not operating. It might be implemented by deriving the enable/disable input signals directly from the shutdown signal. FIG. 14 shows how this might be done for a non-isolated converter. In this figure, electronic control circuit 106 has a section 1407 that responds to either an externally applied on/off signal 1408 or internal protection circuitry that senses an abnormal condition to generate a shutdown signal 1406. Logic gate 1404 uses this shutdown signal as one of its inputs to enable or disable the normal gate drive signal 1407 on its path to the gate drive 1405 leading to the gate terminal of synchronous rectifier 102.

Figure 15:
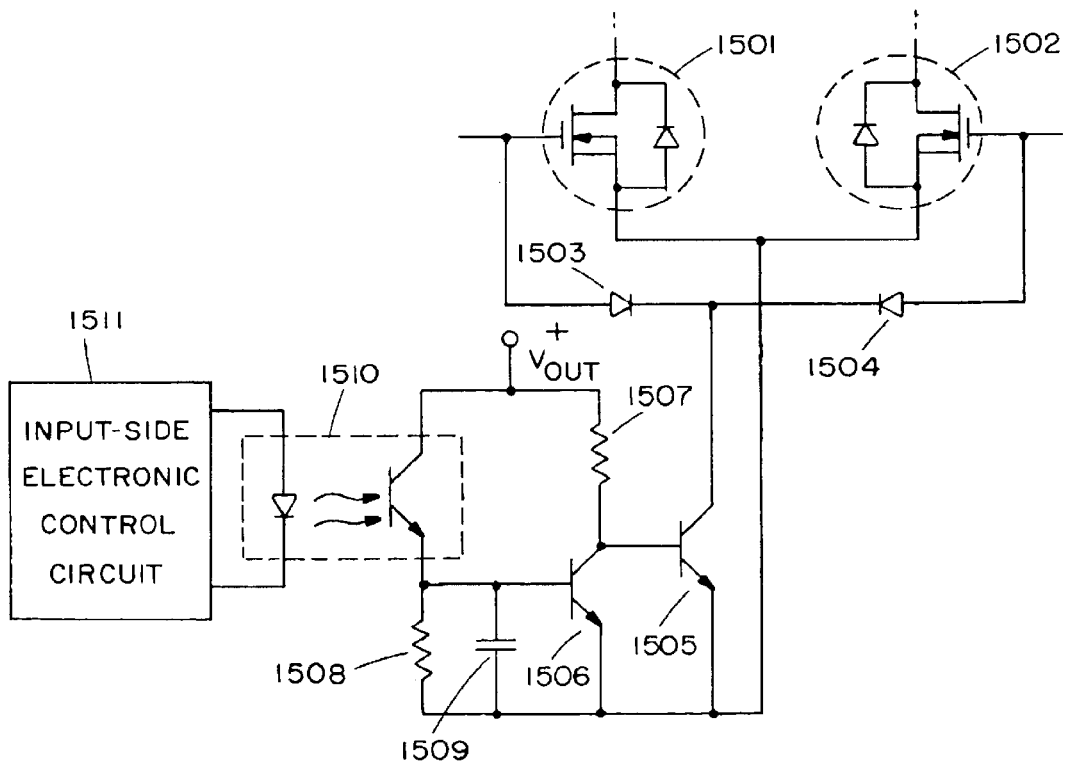
FIG. 15 illustrates a specific implementation of the concept depicted in FIG. 9 in which an opto-isolator is used to convey the enable/disable input signal from the input-side control circuit.

In the case where the enable/disable input signal (no matter from which decision logic or combinations of decision logics it is derived) is located on the input side of an isolated converter the isolation gap could be bridged with an opto-isolator as shown in FIG. 15 to provide the enabling/disabling input signals on the output side of the converter. In this circuit opto-isolator 1510 has an output transistor that drives an inverting buffer composed of transistor 1506 and resistor 1507. The output of this buffer then drives hold-off transistor 1505 that pulls down the gates of synchronous rectifiers 1501 and 1502 through diodes 1503 and 1504.

Figure 16:
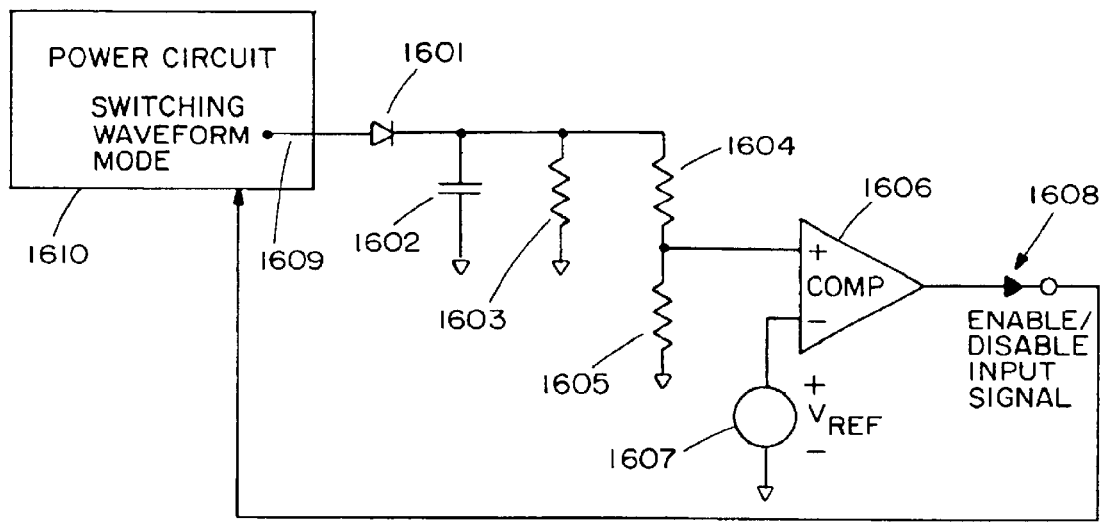
FIG. 16 illustrates using a switching waveform in the power circuit to indicate that the converter has been shutdown to provide a "shutdown decision logic signal."

An alternate method for generating the enable/disable input signals for the shutdown decision logic approach is to indirectly discern when the converter is shutdown by observing waveforms in the power circuit that change their shape depending on whether or not the converter is operating. For instance, the voltage at node X of FIG. 1, the voltage across L1 of FIG. 1, or the voltage across the secondary winding of the circuits in FIGS. 2–5 could be used. FIG. 16 shows one example of how this indirect method might be implemented for any of these circuits. The voltage at a node that has a switching waveform is peak detected by diode 1601, capacitor 1602, and resistor 1603. If the converter is switching, the voltage across capacitor 1602 should be high; if it is not switching the voltage should be low. A comparator senses a divided version of this voltage and compares it to a reference voltage 1607. If the voltage across the capacitor is too low, indicating that the converter has stopped switching, the comparator output goes low 1608. This low signal can then be used to disable the synchronous rectifier in the power circuit 1610. More than one switching node in the power circuit can be sensed. For instance, in the power circuit of FIG. 5, both nodes A and B could be sensed by using two diodes in the peak detect circuit.

Figure 17:
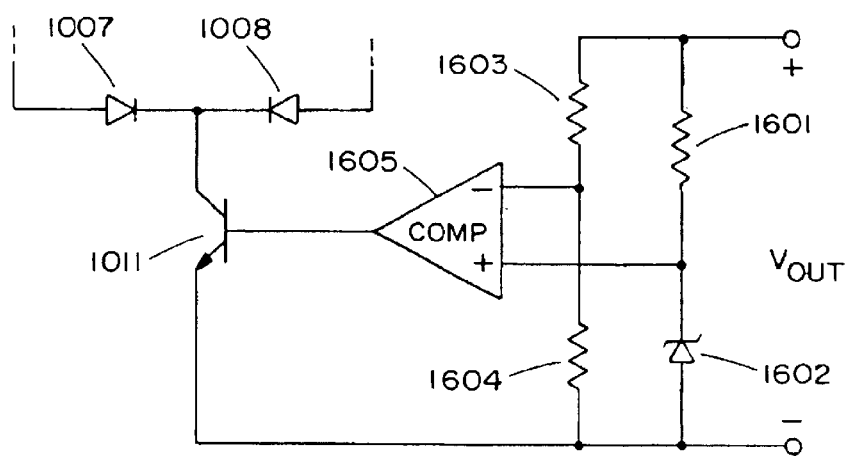
FIG. 17 illustrates using a comparator circuit to detect that the output voltage is too low and to disable the synchronous rectifier.

A second decision logic approach that could be used is to disable the controlled rectifiers of synchronous rectifiers and/or ORing transistors whenever the output voltage is too low. This "output under-voltage decision logic" ensures that the converter will not draw a negative current when conditions such as start-up, an excessive load current, a short-circuit, or some other abnormal event causes the output voltage to be pulled lower than it would be under normal operating conditions. This decision logic approach might be implemented by directly sensing the output voltage with a comparator to see if it is below some minimum threshold (e.g., 90% of its nominal value). The appropriate enable/disable input signals can then be derived with circuitry such as is shown in FIG. 17. This circuitry contains a comparator 1605 that compares a representation of output voltage (generated by the resistor divider network 1603 and 1604) with a voltage generated by reference 102. Hysteresis might be added to the comparator according to well understood principles of design. This decision logic approach might also be implemented by sensing some other voltage or current in the power circuit that is indicative of the output voltage.

A third decision logic approach that could be used is to disable the controlled rectifiers of synchronous rectifiers and/or ORing transistors whenever the output current falls below some threshold level. The threshold level in this "low output current decision logic approach" might ideally be set at zero so that whenever the converter starts to draw a negative current the controlled rectifiers are disabled, thereby preventing the negative current from flowing. However, it is not necessary to choose zero amps for the threshold level.

For instance, a slightly negative value (say 1%–10% of the rated current) could be used to make sure the converter-works as intended all the way down to zero load current. This would allow some negative current to flow in an abnormal situation, but not enough to detrimentally affect the system's performance. Or a slightly positive threshold level could be used to make sure the converter never draws a negative current. This would cause a small but still positive load current to flow through the uncontrolled rectifiers rather than the more efficient controlled rectifiers, but this would not cause significant power dissipation due to the low level of current.

In general, it is not necessary for the threshold level to be precise (it could range between a small negative value and a small positive value). In addition, hysteresis could be incorporated into the comparison being made.

To measure the output current, several well known techniques could be used, such as measuring the voltage across a small resistor in the current path or using a current transformer in series with one of the switches. This could be done on the output side of the converter, or a current that is indicative of the output current could be measured on the input side of the converter.

Figure 18:
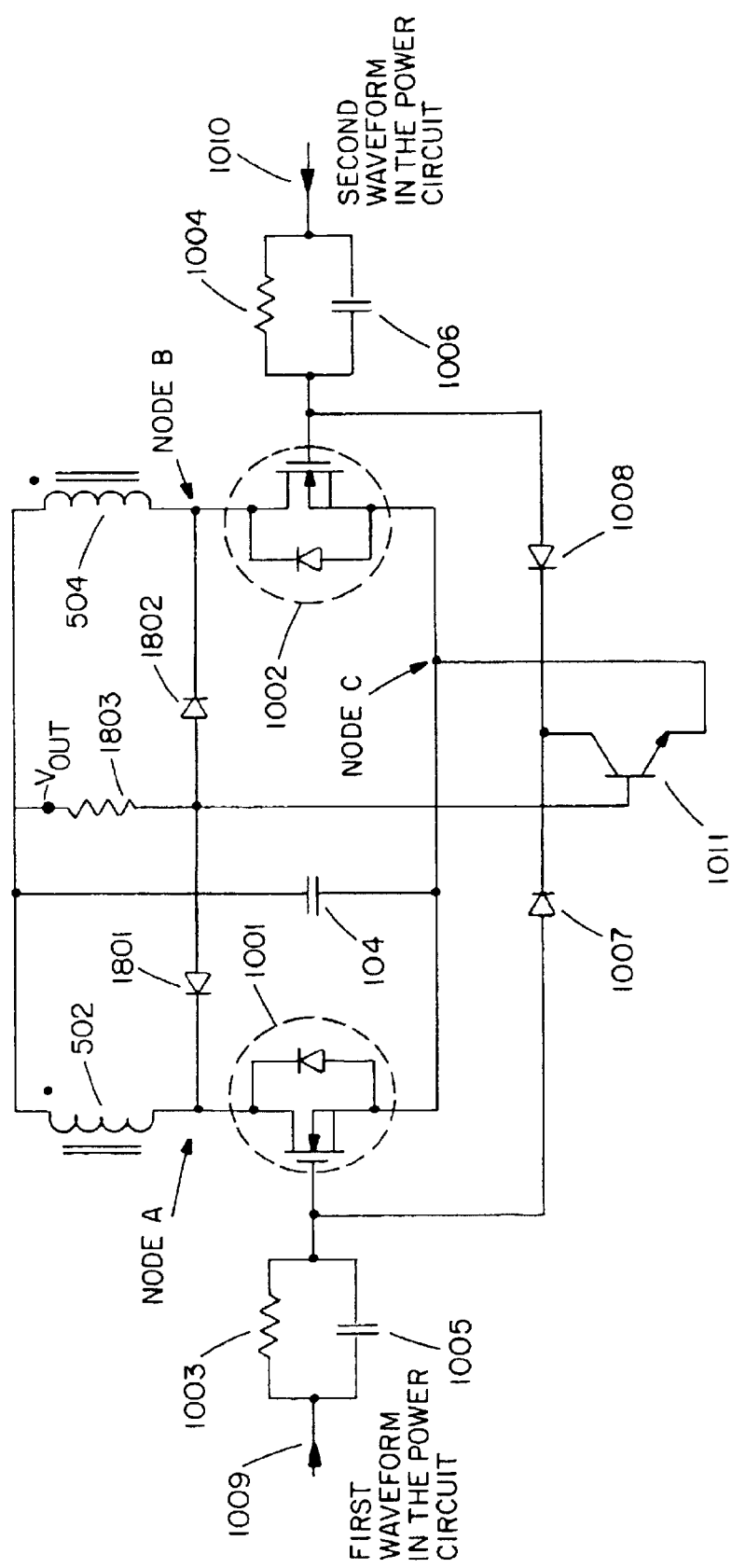
FIG. 18 illustrates a sensing output current direction indirectly through the voltage drop across the synchronous rectifiers.

Another way to implement this decision logic approach is to sense the voltage drop across the synchronous rectifiers or the ORing transistors. FIG. 18 shows one example of this latter method being used when the connection impedance scheme of FIG. 10 is used in the power circuit of FIG. 5. As long as the converter is delivering a positive output current, one or the other or both of the voltages at nodes A and B are negative with respect to node C at all times, depending on which one (or both) of the synchronous rectifiers 1001 and 1002 are conducting. As a result, diodes 1801 and 1802 will keep the base of hold-off transistor 1011 at a low enough voltage that this transistor is turned off and the synchronous rectifiers are enabled. If the load current becomes negative, the voltages at nodes A and B will be positive during the conduction times of the respective synchronous rectifiers, and the base voltage of the hold-off transistor will rise correspondingly (due to pull-up resistor 1803 tied to the positive output terminal $V_{OUT}^+$) such that transistor 1011 will turn on. This disables the controlled rectifiers, as described earlier.

A fourth decision logic approach that could be used is to disable the controlled rectifiers and/or ORing transistors during the start-up phase of the converter's operation. This "start-up decision logic approach" ensures that the converter will not draw a negative current during a turn-on transient. This approach could be implemented with the methods discussed above for the "shutdown decision logic approach," but modified by adding a time delay such that the controlled rectifiers would be kept disabled for some time after the converter is no longer shutdown. Typical start-up transients for dc/dc converters are in the range of 5 ms to 30 ms. Another way to implement this decision logic approach would be to combine the "shutdown decision logic approach" with the "output under-voltage decision logic approach." The converter would have to be operating and the output voltage would have to rise to its nominal value before the controlled rectifiers would be enabled.

A fifth decision logic approach that could be used is to disable the controlled rectifiers of synchronous rectifiers and/or ORing transistors during a "turn-off transient" in which a converter's output voltage is slowly reduced to zero before it is shut down. This "turn-off transient approach" ensures that the converter will not draw a negative current during this turn-off transient period. Again, this decision logic approach could be implemented with the methods discussed above for the "shutdown decision logic approach," but modified by disabling the controlled rectifiers during the turn-off transient prior to the shutting down the converter. Or the "output under-voltage decision logic approach" could be combined with the "shut-down decision logic approach" to achieve the desired result.

Figure 19:
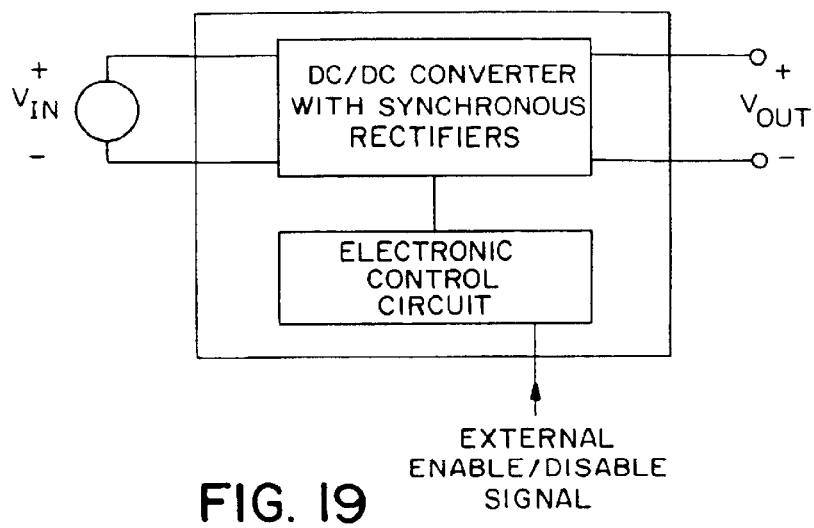
FIG. 19 illustrates a dc/dc converter using synchronous rectifiers in which the decision to enable/disable the rectifiers is provided by an externally supplied signal.

A sixth decision logic approach that could be used is to disable the controlled rectifiers of the synchronous rectifiers and/or ORing transistors when an external signal is applied to the converter. Such a signal might be provided by circuitry that senses that a negative current exists or that a negative current problem might arise. This signal might come from another dc/dc converter, or it might come from auxiliary circuitry on the load board. FIG. 19 shows such an "external signal decision logic approach."

A seventh decision logic approach that could be used is to disable the controlled rectifiers of the synchronous rectifiers and/or ORing transistors whenever a condition exists in which the waveforms presented to the control terminals of the controlled rectifiers will not result in their correct drive. For instance, in the active-drive approach, the controlled rectifiers could be disabled whenever the control circuitry's power rail is too low to guarantee its proper operation. If the active-drive circuitry gets its timing information from a waveform within the power circuit, the controlled rectifiers could be disabled whenever this waveform is too low to be properly interpreted by the drive circuitry. Similarly, in the passive-drive approach, the controlled rectifiers could be disabled whenever the waveform used to drive the control terminals of the controlled rectifiers is too low to guarantee proper control of the controlled rectifiers.

As a particular example of this "inadequate-level decision logic approach," consider the circuit of FIG. 5. In this passive-drive example, the voltage applied to the gates of the synchronous rectifiers 505 and 506 when they are to be turned on is proportional to the voltage across the mid-bus capacitor 500. If this mid-bus capacitor's voltage is too low, the rectifiers will not be driven with a high enough voltage to completely turn them on, and this condition could result in improper operation. Therefore, the mid-bus voltage could be sensed and the controlled rectifiers disabled whenever this voltage is below some threshold value. This threshold could be chosen to be relatively high (e.g. 50% of the mid-bus voltage's nominal value) since the mid-bus voltage should not be below this level during normal operation of the converter.

When a dc/dc converter is operating and delivering power to its output, but the controlled rectifiers of the synchronous rectifiers and/or the ORing transistors are disabled, the converter is compensating for the relatively large drop of the uncontrolled rectifiers. When the time comes to enable the controlled rectifiers, if they are enabled too quickly the output voltage will momentarily increase by the difference in the voltage drop between the uncontrolled and the controlled rectifiers.

To avoid this transient, the controlled rectifiers should be "enabled slowly." By this it is meant that the average on-state voltage across a conducting synchronous rectifier or ORing MOSFET should gradually change from the larger voltage of the uncontrolled rectifier to the smaller voltage of the controlled rectifier over a time period that is comparable to or longer than the converter's bandwidth. When this is done, the converter's feedback loop will have time to adjust the duty ratio (or some other control variable) so that the deviation in the output voltage remains acceptably small. For example, in a converter with a 10 kHz bandwidth to its feedback loop, the slow enabling might occur over about 0.1 ms or longer.

There are two approaches to controlling the average on-state voltage of a synchronous rectifier or an ORing transistor. They are discussed in detail in PCT Application No. WO98/33267 published 30 Jul. 1998.

The first approach is to control the degree to which the controlled rectifier is turned on. For instance, assuming a MOSFET device, the gate voltage (during the time when the MOSFET is to be conducting) can be controlled to be anywhere between the threshold level and several volts above threshold. In the former case, the MOSFET's channel resistance is very high, and in the latter case it is at its minimum value.

The average on-state voltage of a MOSFET can therefore be gradually reduced from that of its uncontrolled rectifier to that of its controlled rectifier by allowing the gate voltage (during the MOSFET's conduction time) to slowly increase from the threshold level to several volts above threshold.

FIG. 10 shows one way to achieve this slow increase of the MOSFETs' gate voltages. As discussed earlier, in normal operation the gate voltage waveforms are square waves that range from nearly zero during the reset half of the cycle to a voltage well above threshold during the drive half of the cycle. The dc value of this waveform is positive. Conversely, when the hold-off circuit is activated, the gate voltage waveform ranges from slightly above zero during the drive half of the cycle to a negative value during the reset half of the cycle. The dc value of this waveform is negative.

When the hold-off circuit of FIG. 10 is deactivated (i.e., when transistor 1011 is turned off), the dc value of the gate's voltage waveform will increase from its initial negative value to its final positive value. This increase is of the form $(1-e^{\tau/t})$, where $\tau$ is the characteristic time constant $C_{1005} \times R_{1003}$ (or $C_{1006} \times R_{1004}$). As the dc voltage of the gate waveform increases, so too does the value of the gate voltage during the drive half cycle of the waveform. By making the characteristic time constant long enough (say several milliseconds), the average on-state voltage of the MOSFET will be slowly reduced. Note that this generally means making $R_{1003}$ (or $R_{1004}$) relatively large, which keeps the current handling requirements of the hold-off transistor small. Also note that the connection impedance again serves multiple roles, including those mentioned before plus providing a means to slowly increase the MOSFETs gate voltage when it is enabled.

The second approach to control the average on-state voltage of a synchronous rectifier or an ORing transistor is to control the percentage of time (during the overall time that the combined device is to be conducting) that the controlled rectifier is turned on. For instance, the controlled rectifier may be turned on very briefly during the conduction time, or it may be turned on for the entire interval. In the former case, the average on-state voltage of the combined device is nearly that of the uncontrolled rectifier (since it carries the current for the vast majority of the time), and in the latter case, the average on-state voltage of the combined device is that of the controlled rectifier.

The average on-state voltage of a synchronous rectifier or an ORing transistor can therefore be gradually reduced from that of its uncontrolled rectifier to that of its controlled rectifier by allowing the percentage of time that the control rectifier is turned on to slowly increase.

Figure 20:
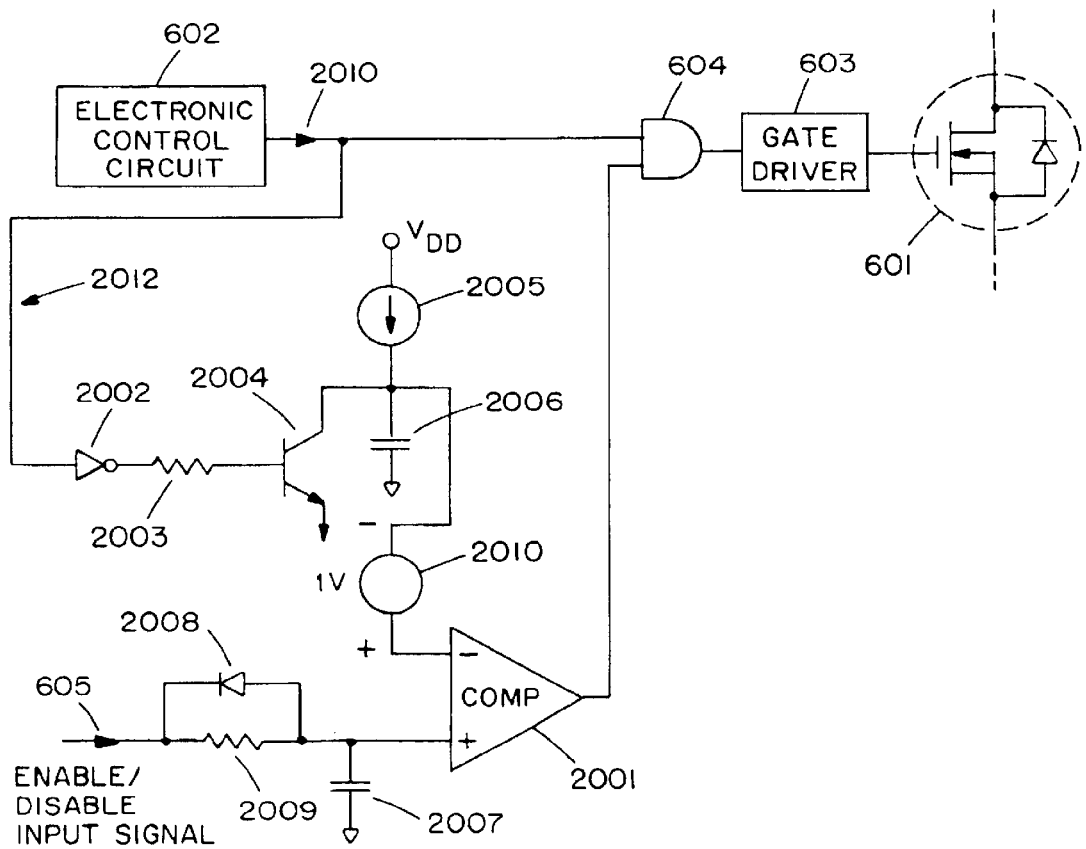
FIG. 20 illustrates slowly enabling a synchronous rectifier by gradually increasing its on-state duration during its normal conduction interval.

FIG. 20 shows one way this might be accomplished when an electronic circuit is used to provide the control signal for a synchronous rectifier. In this example, the logic gate that is used to enable/disable the controlled rectifier is preceded (on its gating input) by a circuit composed of a ramp generator circuit 2012 (inverter 2002, base resistor 2003, transistor 2004, current source 2005, and capacitor 2006), a comparator 2001, and an RC network 2007, 2009 with a diode 2008. The ramp generator circuit creates a ramp that begins at zero volts whenever the drive signal 2010 from the electronic control circuit 602 indicates that the synchronous rectifier 601 should be on. This ramp, which continues to rise throughout the proposed conduction time, is shifted up by 1 volt due to voltage source 2010 and used as the negative input to the comparator, 2001. The output of this comparator will only be high, and therefore allow the drive signal 2010 to get through logic gate 604, if the voltage on the positive input of the comparator is higher than the ramp voltage.

When the enable/disable input signal 605 is low, so too is the positive input to the comparator, and the output of the comparator remains low at all times, disabling the drive signal from reaching the controlled rectifier of 601.

When the enable/disable input signal 605 goes high, the voltage at the positive input to the comparator responds by rising exponentially with the time constant $R_{2009} \times C_{2007}$. As this voltage slowly rises, so too does the fraction of the conduction interval that the controlled rectifier is turned on. Once the voltage across capacitor 2007 charges high enough, the controlled rectifier will be turned on for the entire conduction interval. Diode 2008 makes sure that when the hold-off circuit is to be activated, the voltage across capacitor 2007 can be discharged quickly.

The circuit shown in FIG. 20 could also be used to gradually turn on a connection switch in the scheme depicted in FIG. 7, or to gradually turn-off a hold-off circuitry working against a connection impedance in the scheme depicted in FIG. 8.

It is also possible, using the general concepts discussed above, to control the rate at which the dc/dc converter is transitioned from an enabled state to a disabled state.

Figure 22:
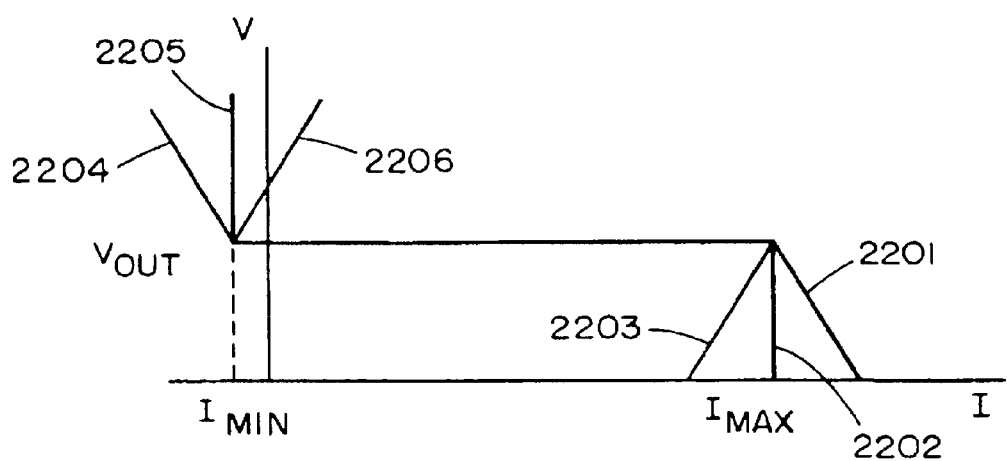
FIG. 22 illustrates that voltage/current characteristics of a converter having both minimum and maximum current limits.

Most dc/dc converters incorporate a maximum current limit in their control circuitry to protect the converter from the affects of a too large output current. Various schemes are used, including ones that shut the converter off and ones that continue to operate with a reduced output voltage that is a function of the load current. In the latter category, some converters allow the output current to increase slightly above the threshold limit as the output voltage is reduced, some maintain a constant output current, and others cause the output current to decrease. These approaches are sometimes referred to as "fold-forward," "constant current source," and "fold-back" current limits, and various methods to achieve each approach are well known in the field. For example, as illustrated in FIG. 22, the converter normally operates at a constant output voltage $V_{OUT}$ with the current rising as needed to serve a particular load. However, if the current reaches a maximum level $I_{MAX}$, the voltage of the output is reduced as a function of the load current. Fold-forward, constant current source and fold-back current limits are illustrated at 2201, 2202 and 2203, respectively.

Similarly, a novel minimum current limit $I_{MIN}$ can be incorporated into a control circuit to avoid the problems associated with negative current flow in a dc/dc converter, particularly one that uses synchronous rectifiers and/or ORing transistors, but is not limited to such converters. In general, such a current limit would increase the output voltage once the load current falls below some threshold level. The increasing output voltage would then counteract the desire for the output current to decrease further.

The threshold level for the minimum current limit could be slightly negative as illustrated, zero, or slightly positive. The desire is to avoid a negative current that is large enough to cause a problem. For instance, a slightly negative threshold level (say 1%–10% of the rated current) could be used to make sure the converter works as intended all the way down to zero load current. This would allow some negative current to flow in an abnormal situation, but not enough to detrimentally affect the system's performance. Or a slightly positive threshold level could be used to make sure the converter never draws a negative current. This would cause a small, but still positive load current to flow through the uncontrolled rectifiers rather than the more efficient controlled rectifiers, but this would not cause significant power dissipation due to the low level of current. This condition could actually give less overall dissipation at light loads since the switching losses normally incurred by turning the controlled rectifiers on and off are no longer present. This saving in switching losses could be bigger than the additional conduction loss caused when the light load current flows through the uncontrolled rectifier.

Once the threshold current level is reached, the minimum current limit control circuitry can be designed to display the characteristics of a fold-forward, a constant current source, or a fold-back current limit. Here, a fold-forward characteristic 2204 would allow the output current to continue to decrease slightly as the output voltage is increased. The constant current source characteristic 2205 would hold the output current roughly constant as the output voltage increased. And the fold-back characteristic 2206 would make the output current increase above the threshold level once the output voltage increased. These different characteristics, and methods for achieving them in a control circuit, will be readily apparent to one skilled in the art since they are similar to those used for a maximum current limit.

Figure 21:
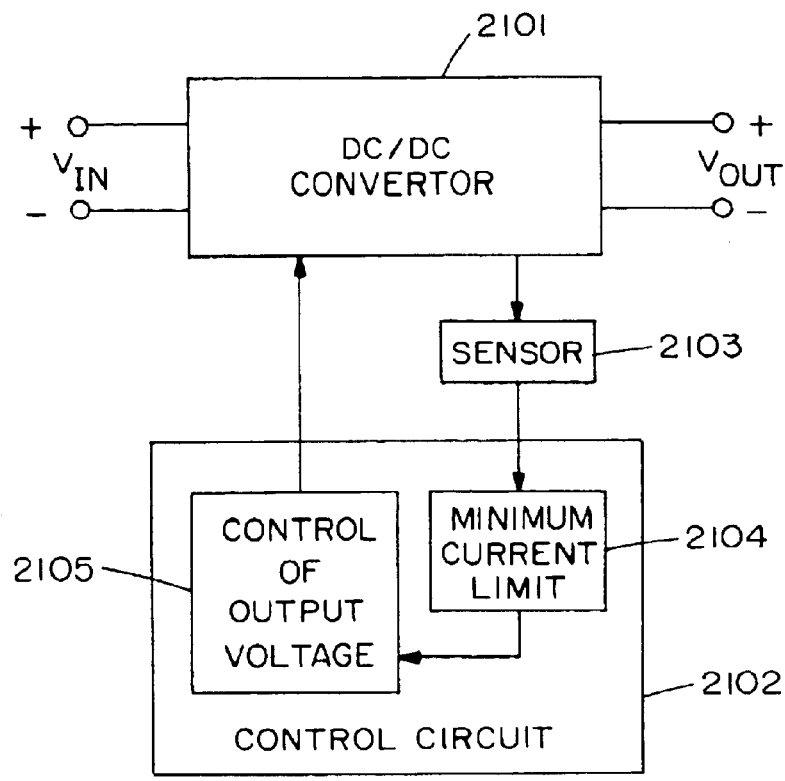
FIG. 21 illustrates a converter implementing a minimum current limit.

FIG. 21 shows a block diagram of a dc/dc converter in which a minimum current limit is incorporated into the control circuitry. This dc/dc converter could be a non-isolated or an isolated converter of any topology. The sensing of the output current could be accomplished with several different types of sensors, such as a resistor, a current transformer, or a Hall effect sensor. The sensed current could be at the output terminals, or at some other location within the power circuit where the current sensed is indicative of the output current. In some cases, other variables besides current (but that are indicative of the output current) could be sensed. In general, sensing techniques like those used in the third, low output current decision logic approach discussed above with respect to disabling the synchronous rectifiers and ORing transistors may be used here.

To increase the output voltage once the minimum current level is reached, the control circuit would typically adjust the dc/dc converter's duty cycle. For instance, in the down-converters of FIGS. 1–5, the duty cycle of transistor 101 would be increased.

An advantage of increasing the voltage output rather than turning off the synchronous rectifiers is that, with the synchronous rectifiers left on, they continue to operate in an efficient mode when large currents are flowing. On the other hand, when the rectifiers are turned off, the uncontrolled rectifier continues to operate alone, and in this inefficient condition, the circuit may heat up.

It will be apparent that one could incorporate both the gate enabling/disabling technique and a minimum current limit technique described above to avoid the problems associated with a negative current limit. For instance, the output voltage could be increased when the minimum current threshold is reached, and the synchronous rectifiers and ORing transistor could subsequently be disabled when a voltage threshold or other current threshold were reached.

Figure 23:
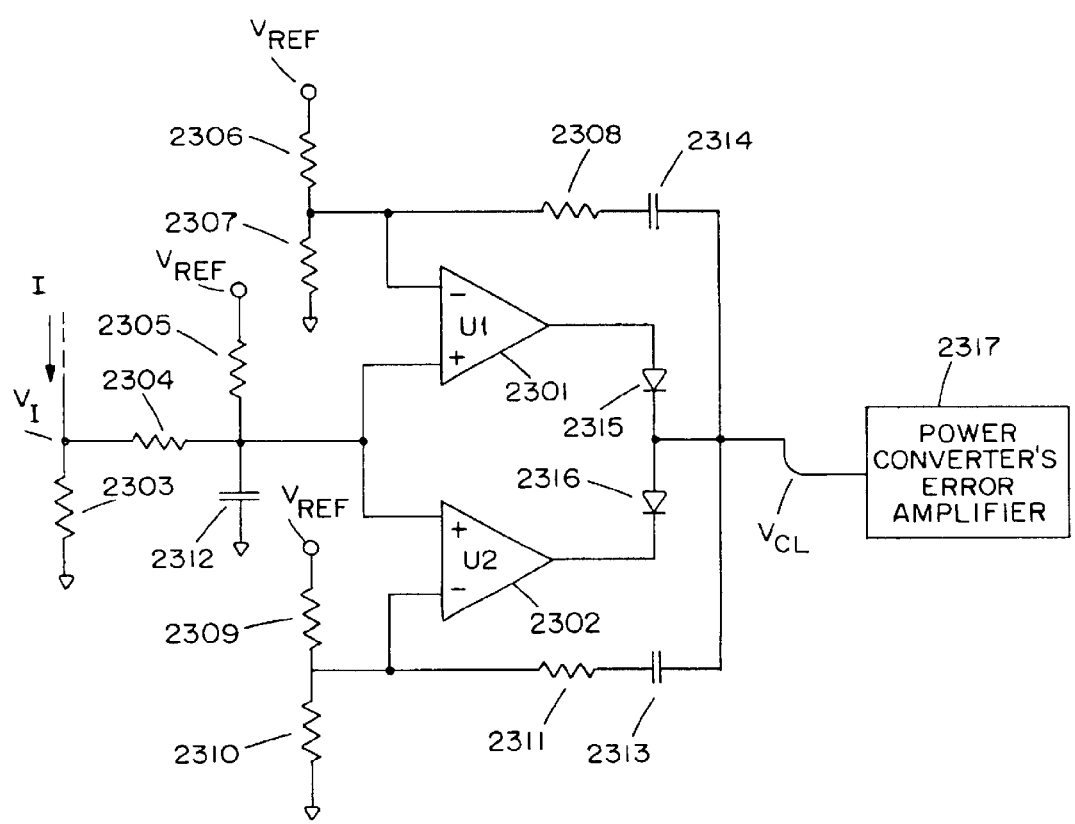
FIG. 23 illustrates a circuit to implement both maximum and minimum current limits.

FIG. 23 shows one method to implement both a maximum and a minimum current limit. In this figure U1 2301 and U2 2302 are op-amps and $V_{ref}$ is a reference voltage. The current, I, to be sensed flows through resistor 2303 and creates a voltage, $V_I$, relative to ground. The op-amps are configured as differential amplifiers with the addition of resistors 2304 through 2311. Capacitors 2313 and 2314 reduce the gains of these amplifiers at high frequencies to stabilize the current limit feedback loops. Capacitor 2312 filters any high frequency components of the sensed signal, $V_I$, due to noise in the power circuit.

Op-amp 2301 is responsible for the maximum current limit and op-amp 2302 is responsible for the minimum current limit. Resistors 2305 and 2304 provide a level shift, $V_{LS}$, for $V_I$, the amount of the shift dependent on $V_{ref}$ and the relative values of the two resistors. Both op-amps amplify the difference between this level-shifted value of $V_I$, and a threshold voltage, but they each have different thresholds values, $V_{T1}$ and $V_{T2}$, set by $V_{ref}$ and either resistors 2306 and 2307 or resistors 2309 and 2310, respectively. $V_{T1}$ is set higher than $V_{LS}$ by an amount that corresponds to the maximum current limit desired. Similarly, $V_{T1}$ is set relative to $V_{LS}$ by an amount that corresponds to the minimum current limit.

Due to diodes 2315 and 2316, the two op-amps can only affect the output voltage, $V_O$, in one direction. Op-amp 2301 will pull $V_{CL}$ up when the sensed current exceeds the maximum current limit, and op-amp 2302 will pull $V_{CL}$ down when the sensed current falls below the minimum current limit. The more the sensed current exceeds (or falls below) these two limits, the more the op-amps pull up (or down) $V_{CL}$. When the sensed current is between the two current limits, node $V_{CL}$ is essentially in a high impedance state (limited by the relatively high impedances of resistors 2308 and 2311 and capacitors 2313 and 2314.

Finally, $V_{CL}$ is used as an additional input to the error amplifier 2317 of the normal feedback loop that determines the power converter's duty cycle. It will affect the error amplifier, and therefore the duty cycle, only when the sensed current goes out of range. Its connection to the amplifier is such that when the sensed current exceeds the maximum current limit, the power converter's output voltage is reduced. Conversely, when the sensed current falls below the minimum current limit, $V_{CL}$ causes the converter's output voltage to rise.

While this invention has been particularly shown and described with references to preferred embodiments thereof, it will be understood by those skilled in the art that various changes in form and details may be made therein without departing from the scope of the invention encompassed by the appended claims. For instance, synchronous rectifiers and/or ORing transistors could be implemented with P-channel instead of N-channel devices, in which case the detailed connection schemes and polarity of logic might be reversed from those shown in the figures.

What is claimed is:

1. A DC to DC power converter which delivers an output voltage and an output current at its output terminals, the converter comprising:
   a controlled rectifier transistor through which current flows to the output terminals;
   a control circuit which controls the output voltage; and
   override control to the control circuit, responsive to a condition of the power converter or connected circuitry, that increases the output voltage to effect a minimum current limit of the output current at the output terminals.

2. A power converter as claimed in claim 1 wherein the override control substantially eliminates negative current flow through the controlled rectifier.

3. A power converter as claimed in claim 1 wherein the override control effects a fold-back or fold-forward minimum current limit.

4. A power converter as claimed in claim 1 wherein the condition to which the override control responds is a signal indicative of output current.

5. A power converter as claimed in claim 4 wherein the override control responds directly to sensed output current.

6. A power converter as claimed in claim 4 wherein the signal indicative of output current is a sensed current within the power converter.

7. A power converter as claimed in claim 6 wherein the signal indicative of output current is a sensed current through a controlled rectifier in the power converter.

8. A power converter as claimed in claim 7 wherein the signal indicative of output current is a current through an ORing transistor coupled to the output of the power converter.

9. A power converter as claimed in claim 1 further comprising disabling at least one controlled rectifier in the power converter circuit in response to decision logic.

10. A power converter as claimed in claim 9 wherein the at least one controlled rectifier which is disabled is an ORing transistor at the output of the power converter.

11. A power converter as claimed in claim 1 wherein the minimum current limit is a negative current.

12. A power converter as claimed in claim 1 further comprising:
   first and second primary transformer windings connected to a power source;
   a secondary transformer winding circuit having at least one secondary winding coupled to at least one of the first and second primary windings;
   plural controlled rectifiers, each having a parallel uncontrolled rectifier and each connected to a secondary winding, each controlled rectifier being turned on and off in synchronization with the voltage waveform across a primary winding to provide the output, each primary winding having a voltage waveform with a fixed duty cycle and transition times which are short relative to the on-state and off-state times of the controlled rectifies; and
   a regulator which regulates the output while the fixed duty cycle is maintained.

13. A power converter as claimed in claim 1 wherein the override control circuitry controls duty cycle of a regulating transistor to control voltage output that effects the minimum current limit.

14. A power converter as claimed in claim 1 wherein the minimum current limit is effected without disabling the controlled rectifier transistor.

15. A method of converting DC to DC power comprising:
   providing a controlled rectifier transistor through which current flows to the output terminals;
   controlling an output voltage through a control circuit; and
   overriding control to the control circuit to increase the output voltage to effect a minimum current limit of output current at the output terminals.

16. A method as claimed in claim 15 wherein negative current flow through a controlled rectifier is substantially eliminated.

17. A method as claimed in claim 15 wherein the override is in response to a signal indicative of output current.

18. A mod as claimed in claim 15 wherein the minimum current limit is a negative current.

19. A method as claimed in claim 15 wherein the minimum current limit is effected by controlling duty cycle of a regulating transistor to control voltage output that effects the minimum current limit.

20. A method as claimed in claim 15 wherein the minimum current limit is effected without disabling the controlled rectifier transistor.

21. A method of converting DC to DC power comprising:
providing a controlled rectifier transistor through which output current flows;
controlling an output voltage through a control circuit; and
overriding control to the control circuit to increase the output voltage to effect a negative minimum current limit of the output current flowing through the controlled rectifier transistor.

22. A DC to DC power converter having an output comprising:

a controlled rectifier transistor through which output current flows;

a control circuit which controls an output voltage; and override control to the control circuit, responsive to a condition of the power converter or connected circuit, than increases the voltage to effect a negative minimum current limit of the output current flowing through the controlled rectifier transistor.

23. A DC to DC power converter comprising:

a controlled rectifier transistor through which output current flows;

means for controlling an output voltage through a control circuit; and means for overriding control to the control circuit to increase the output voltage to effect a minimum current limit of the output current.

* * * * *

UNITED STATES PATENT AND TRADEMARK OFFICE
CERTIFICATE OF CORRECTION

PATENT NO. : 6,894,468 B1  Page 1 of 1
DATED : May 17, 2005
INVENTOR(S) : Joshua H. Bretz et al.

It is certified that error appears in the above-identified patent and that said Letters Patent is hereby corrected as shown below:

<u>Column 20,</u>
Line 7, delete "than increases the voltage" and insert -- that increases the output voltage --.

Signed and Sealed this

Ninth Day of August, 2005

JON W. DUDAS
*Director of the United States Patent and Trademark Office*